A. J. CROSS.
MULTIFOCAL OPHTHALMIC LENS.
APPLICATION FILED JAN. 21, 1922.

1,415,318. Patented May 9, 1922.

INVENTOR
ANDREW JAY CROSS
BY
ATTORNEY

UNITED STATES PATENT OFFICE.

ANDREW JAY CROSS, OF NEW YORK, N. Y.

MULTIFOCAL OPHTHALMIC LENS.

1,415,318.		Specification of Letters Patent.		Patented May 9, 1922.

Application filed January 21, 1922. Serial No. 530,744.

*To all whom it may concern:*

Be it known that I, ANDREW JAY CROSS, a citizen of the United States, and a resident of the city, county, and State of New York, have invented a new and useful Improvement in Multifocal Ophthalmic Lenses, of which the following is a full, clear, and exact description.

My invention relates to improvements in multifocal ophthalmic lenses, and more particularly to trifocal lenses. The general object of my invention is to produce a trifocal lens which can be easily made with sufficient accuracy, and in which the distance and near vision fields or visual areas are substantially as usual, and the intermediate areas occupy generally triangular spaces on opposite edge portions of the lens, and partly between the near and close vision fields. To be more precise, my invention is intended to produce a lens which will be as nearly perfect as possible, having distance, close vision, and intermediate visual areas, and with the latter provided with an approximately common optical center or principal axis which is not common to the center or centers of the other fields, to the end that the lens may be easily made. I find in practice that it is desirable to have the distance and close vision fields provided with a common optical center or principal axis, as this prevents confusion and aberration as the eye passes from field to field; but in making intermediate visual areas with a principal axis or optical center common to the center of the other fields, I find that it is a very difficult lens to make, because of mechanical difficulties in grinding. My experiments have further shown that so long as these intermediate visual areas have an optical center or principal axis common to themselves, it is not important that this center be common to the other field or fields of vision, because the distance and near visual fields of glasses are in constant use, while the intermediate fields are used incidentally. It is important to have them arranged substantially as shown, so that the wearer of the lens can, by a slight turn of the eye, look through the intermediate vision fields, but if these fields have a common principal axis or optical center, their incidental use is not confusing. My invention consists in a lens having these intermediate visual fields or areas produced thereon with a common principal axis which is not common, however, to the other fields of vision. I have heretofore made multifocal lenses with a common principal axis and with intermediate vision areas arranged similarly to those shown in the present case, but the center of the intermediate field is common to the other fields of vision, and as stated above, it is a very difficult proposition to make a lens of this class commercially. This will be better understood from the description which follows.

Reference is to be had to the accompanying drawings forming a part of this specification, in which similar reference characters indicate corresponding parts in all the views.

Figure 1:
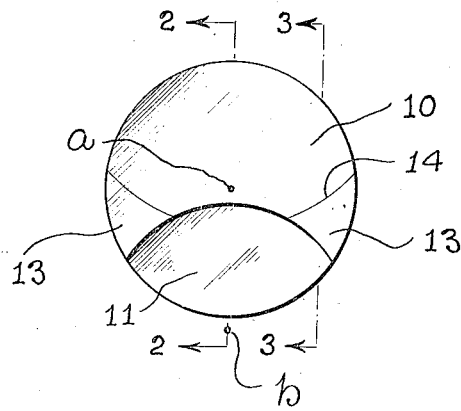
Figure 1 is an inside elevation of a lens showing my improvement.
Figure 2:
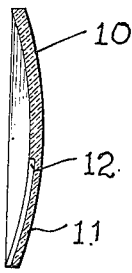
Figure 2 is a cross section on the line 2—2 of Figure 1.
Figure 3:
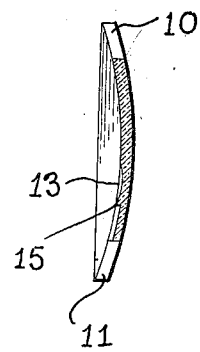
Figure 3 is a cross section on the line 3—3 of Figure 1.

By way of example I have shown my invention in connection with a monocentric lens having the distance field 10 and near vision field 11 united edge to edge by fusing, but the invention might be applied to a solid ground lens. Lenses of this kind have the outer area smooth and in a single plane, and on the inner side there is usually and preferably a slight overhang 12 where the fields unite. This has nothing to do with the present invention, and it is usual because it is mechanically easier to make lenses this way with a sharp definition between the visual fields.

As illustrated, the visual areas 10 and 11 have a common optical center or principal axis at "a," which as shown is in the distance vision field 10, but it might just as well be at the junction of the two fields 10 and 11, or even in the visual area 11, without affecting this invention. It is important, however, that the two fields have a common optical center.

The intermediate visual areas 13 are not new in a general sense, and I have heretofore made lenses having substantially this triangular arrangement at the side portions of the lens and partially between the fields 10 and 11. As illustrated, these fields merge at a line 14 with the distance field 10, having a slight overhang where they meet the close vision member 11. The line 14 is not noticeable in the finished lens, and the overhang 15 is not essential, though as stated above, I find that it is easier to get a sharp definition by having this overhang, and find it mechanically easier to make the lens. The intermediate areas 13 have an approximately common center, which I find can be conveniently located at "b" as in Figure 1, which is the point below the lower periphery of the complete lens. Any lens grinder, however, will understand that this center can be located at a desired point, and the important thing is to have an approximately common optical center for the two fields.

The invention as described seems exceedingly simple but years of time have been used and enormous expense incurred in trying to perfect a multifocal lens which will not be objectionable to the wearer, which will give him a sufficient scope in use, and which can be mechanically made at a cost to make the lens commercial. This last feature has been an exceedingly difficult one, and I have found that by locating the fields as described, and giving them an approximately common principal axis independent of the other fields of vision, the grinding can be effected at moderate cost, and a very satisfactory and handsome lens produced.

In the finished article, the fields 13 can be observed only by minute scrutiny, and they serve the purpose of adding another power to the ordinary bifocal lens. They can be easily made with a common center different from that of the other zones or visual areas, and as their use is only occasional and incidental, the difference in optical centers is not confusing or noticeable.

In practice I have made this intermediate field or area on lenses in which the parts 10 and 11 have been united by edge fusing and ground monocentric, but the invention is not limited to such a lens.

I claim:—

1. As an improved article of manufacture, a trifocal lens having near and distance visual fields arranged one above the other, and intermediate visual fields at opposite edge portions and partly between the near and distance visual fields, the intermediate fields having an approximately common optical center which is not common to the other visual fields of the lens.

2. As an improved article of manufacture, a trifocal lens having near and distance visual areas one above the other which are monocentric, and intermediate visual areas at the sides of and partly between the near and distance visual fields or areas, said intermediate fields having an approximately common principal axis which is not common to the other visual fields or areas.

3. As an improved article of manufacture, a multifocal bicentric lens comprising near and distance fields or areas which are monocentric, and intermediate visual fields or areas which are also monocentric, but having their principal axis independent of the axis of the near and distance areas.

4. As an improved article of manufacture, a trifocal ophthalmic lens comprising near and distance visual fields or areas, and intermediate visual fields or areas spaced apart from each other and having an independent common principal axis.

ANDREW JAY CROSS.

Witnesses:
WARREN B. HUTCHINSON,
M. G. O'DONNELL.